United States Patent
Kagata et al.

(10) Patent No.: US 10,543,683 B2
(45) Date of Patent: Jan. 28, 2020

(54) INK JET RECORDING METHOD AND CONTROL METHOD OF INK JET RECORDING APPARATUS

(71) Applicant: Seiko Epson Corporation, Tokyo (JP)

(72) Inventors: Takayoshi Kagata, Shiojiri (JP); Akira Mizutani, Matsumoto (JP); Tadashi Watanabe, Shiojiri (JP); Kenichi Seguchi, Okaya (JP); Tsuyoshi Sano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/591,436

(22) Filed: May 10, 2017

(65) Prior Publication Data

US 2017/0368819 A1    Dec. 28, 2017

(30) Foreign Application Priority Data

Jun. 28, 2016 (JP) ................... 2016-128051

(51) Int. Cl.
| | | |
|---|---|---|
| *B41J 2/045* | (2006.01) | |
| *B41J 2/175* | (2006.01) | |
| *C09D 11/033* | (2014.01) | |
| *C09D 11/107* | (2014.01) | |
| *C09D 11/322* | (2014.01) | |
| *C09D 11/38* | (2014.01) | |
| *B41J 2/16* | (2006.01) | |

(52) U.S. Cl.
CPC ....... *B41J 2/04563* (2013.01); *B41J 2/04581* (2013.01); *B41J 2/1606* (2013.01); *B41J 2/175* (2013.01); *C09D 11/033* (2013.01); *C09D 11/107* (2013.01); *C09D 11/322* (2013.01); *C09D 11/38* (2013.01); *B41J 2202/03* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,955,515 A | * | 9/1999 | Kimura | B41J 2/04528 |
| | | | | 106/31.13 |
| 6,372,818 B1 | * | 4/2002 | Kimura | C09D 11/30 |
| | | | | 160/31.27 |
| 9,605,172 B2 | * | 3/2017 | Aoki | C09D 11/38 |

(Continued)

FOREIGN PATENT DOCUMENTS

| | | |
|---|---|---|
| JP | 5504890 B2 | 5/2014 |
| JP | 2015061896 A * | 4/2015 |

*Primary Examiner* — Henok D Legesse

(74) *Attorney, Agent, or Firm* — Harness, Dickey & Pierce, P.L.C.

(57) ABSTRACT

An ink jet recording method according to the present embodiment includes ejecting a water-based ink composition where a content of an organic solvent having a standard boiling point of 280° C. or more is 0.5% by mass or less from a head nozzle and attaching the water-based ink composition to a recording medium, in which a contact angle between at least a part of the surface of the member in contact with the water-based ink composition in the members in the head and the water-based ink composition is 30° or less, and the surface of the member in contact with the water-based ink composition is formed of a material having an SP value of 9 or less.

19 Claims, 1 Drawing Sheet

(56) References Cited

U.S. PATENT DOCUMENTS

| | | | |
|---|---|---|---|
| 2006/0181568 A1* | 8/2006 | Aoki | B41J 2/16508 |
| | | | 347/30 |
| 2010/0034973 A1 | 2/2010 | Ohya et al. | |
| 2010/0216936 A1* | 8/2010 | Inushima | C09B 67/0033 |
| | | | 524/548 |
| 2012/0268519 A1 | 10/2012 | Ohya et al. | |
| 2015/0049144 A1* | 2/2015 | Aoki | B41J 2/17506 |
| | | | 347/85 |
| 2015/0252200 A1* | 9/2015 | Kagata | C09D 11/106 |
| | | | 523/201 |

* cited by examiner

INK JET RECORDING METHOD AND CONTROL METHOD OF INK JET RECORDING APPARATUS

BACKGROUND

1. Technical Field

The present invention relates to an ink jet recording method and a control method of an ink jet recording apparatus.

2. Related Art

The ink jet method is capable of recording high-definition images with a relatively simple apparatus, and is rapidly being developed in various fields. Among these, various investigations have been carried out into ejection stability and the like. For example, there is disclosed a water-based ink jet ink including a pigment, an ink-soluble resin, a solvent having a surface tension of 25 mN/m or more and 40 mN/m or less, and a silicone-based or fluorine-based surfactant, in which the ink is printed on either an absorbing or a non-absorbing recording medium, and the drying and thickening speed is improved by heating the recording medium at the time of printing.

Japanese Patent No. 5504890 is an example of the related art.

In the related art, an ink composition which does not include a high-boiling point solvent is used for a water-based ink composition used for recording on an ink non-absorbing or low absorbing recording medium. This is because, for a water-based ink composition which includes a high-boiling point solvent, the drying property of the ink composition on the recording medium is poor and sufficient abrasion resistance is not obtained on the ink non-absorbing or low absorbing recording medium. In addition, since the drying property of the ink is poor, bleeding occurs and the image quality also decreases.

In addition, in order to provide recorded matter excellent in abrasion resistance, a resin is added to the water-based ink composition used for recording on a non-ink absorbing or low absorbing recording medium. The resin is dissolved and dispersed in the ink composition as resin particles. When the ink composition in the head is dried, there is a problem in that the resin particles are aggregated and the resin in the ink composition accommodated in the recording head is adhered to the head wall surface or the like, causing head clogging. The problem of head clogging becomes more conspicuous the longer continuous printing is performed without performing suction cleaning.

When a high boiling point solvent is added to the ink composition in order to improve the clogging resistance of the head, as described above, the drying property of the ink composition on the recording medium is lowered, and there is a problem in that sufficient image quality and abrasion resistance are not obtained in the ink non-absorbing or low absorbing recording medium. Therefore, improvement in the clogging resistance of the head and improvement in the abrasion resistance of the image are in a trade-off relationship, making it difficult to achieve both.

SUMMARY

An advantage of some aspects of the invention is to provide an ink jet recording method capable of suppressing head clogging and forming an image excellent in abrasion resistance, and a control method of an ink jet recording apparatus.

The present inventors carried out extensive research in order to solve the problems described above. As a result, it was found that, by lowering a contact angle of the ink with respect to the material used for the members in the head, it is possible to improve the peeling property of the resin adhered to the inner wall of the head, the resin easily forms a film on the recording medium, and the abrasion resistance is also excellent.

According to an aspect of the invention, there is provided an ink jet recording method including ejecting a water-based ink composition where a content of an organic solvent having a standard boiling point of 280° C. or more is 0.5% by mass or less from a head nozzle and attaching the ink composition to a recording medium, in which the contact angle between at least a part of the surface of the member in contact with the water-based ink composition in the members in the head and the water-based ink composition is 30° or less, and the surface of the member in contact with the water-based ink composition is formed of a material having an SP value of 9 or less.

In the aspect of the invention, by defining the ink composition such that the surface of the member of the head in contact with the ink composition is formed of the material having an SP value of 9 or less and the contact angle with respect to the surface of the member of the head is 30° or less, even in a case where the composition of the ink composition is changed by drying the ink composition and the resin particles are aggregated and adhered to the inner wall of the constituent member of the head, it is possible to easily remove the adhered resin and to suppress the head clogging. In addition, in the aspect of the invention, due to the content of the organic solvent with a standard boiling point of 280° C. or more being 0.5% by mass or less, it is possible to improve the ink drying property, the resin easily forms a film on the recording medium, and it is possible to improve the abrasion resistance.

For example, the surface of the member in contact with the water-based ink composition is formed of an inorganic material.

The surface temperature of the recording medium is preferably 45° C. or less when the water-based ink composition is attached to the recording medium. Due to this, it is possible to suppress drying of the ink composition in the head and to suppress head clogging due to radiant heat from the means for heating the surface of the recording medium or the recording medium.

The surface tension of the water-based ink composition is preferably 27 mN/m or less. Due to this, it is possible to increase wettability to the base material, and to improve the filling and coloring property. In addition, by increasing the wettability, the dot diameter widens, the drying efficiency increases, and the abrasion resistance improves.

The water-based ink composition preferably includes an organic solvent having a standard boiling point of 260° C. or less. The boiling point of the organic solvent included in the ink composition being 260° C. or less makes it possible to improve the drying property of the ink composition and to form an image excellent in abrasion resistance.

The head preferably includes a pressure chamber, and an element for applying pressure to the pressure chamber to eject the water-based ink composition from the nozzle, in which, in the pressure chamber, the element is arranged at a location other than a position opposed to an outlet which communicates with the nozzle. In a head where an element which ejects the ink composition is not provided directly on the nozzle, using the ink composition described above makes it possible to easily remove the resin, even if the resin is adhered to the inner wall of the head.

For example, the water-based ink composition includes a surfactant having an HLB value of 8 to 16. In addition, for example, the content of the surfactant is 0.5% by mass or more. In addition, for example, as a surfactant, at least one of a silicone-based surfactant, an acetylene glycol-based surfactant, and a fluorine-based surfactant is contained. Defining at least one of the HLB value, the content, and the material of the surfactant in this manner makes it possible to remove the adhered resin from the inner wall of the head even in a case where the resin is adhered to the inner wall of the head.

For example, the recording medium is a non-absorbing or low absorbing recording medium. In addition, for example, the water-based ink composition includes 0.5 to 10% by mass of resin fine particles.

A contact angle of the water-based ink composition is preferably 25° or less with respect to a base material formed by forming a coating film of the water-based ink composition on the member. Due to this, it is possible to improve the removability of the resin adhered to the inner wall of the head.

In addition, an aspect of the invention is a control method of an ink jet recording apparatus including a control portion and the head, in which control is performed by the control portion so as to perform recording by the ink jet recording method described above.

In addition, for example, control is performed such that recording is carried out for one hour or more without performing a maintenance step of discharging the water-based ink jet ink composition from a nozzle using a mechanism other than a mechanism provided in the head for ejecting ink for recording in the head.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
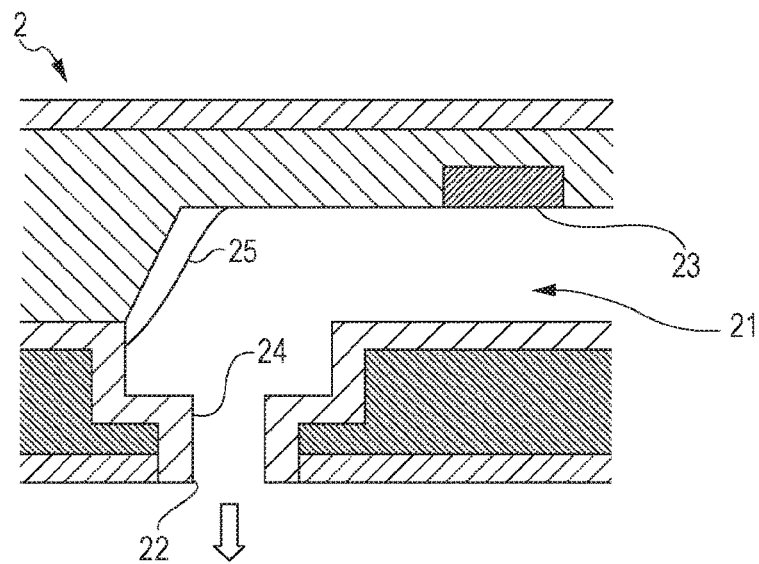
FIG. 1 is a schematic diagram of a recording head of the present embodiment.

Detailed description will be given below of an embodiment (referred to below as the present embodiment) of the invention while referring to the drawings as necessary; however, the invention is not limited thereto, and various modifications are possible without departing from the gist thereof. Here, in the drawings, the same reference numerals are given to the same elements, and duplicate explanation thereof will be omitted. In addition, positional relationships such as up, down, left, and right are based on the positional relationships shown in the drawings unless otherwise noted. Further, the dimensional ratios of the drawings are not limited to the illustrated ratios.

The ink jet recording method according to the present embodiment includes ejecting a water-based ink composition where a content of an organic solvent having a standard boiling point of 280° C. or more is 0.5% by mass or less from a head nozzle and attaching the ink composition to a recording medium, in which a contact angle between at least a part of the surface of the member in contact with the water-based ink composition in the members in the head and the water-based ink composition is 30° or less, and the surface of the member in contact with the water-based ink composition is formed of a material having an SP value of 9 or less.

When the ink remains in the pressure chamber due to the influence of air bubbles or the like generated in the ink jet head, drying of the ink composition proceeds easily due to the heat of the platen. As a result, there is a problem that the resin of the resin emulsion included in the ink composition is adhered to the head wall surface and clogging occurs. There is a problem in that it is not possible to eliminate the resin adhered to the head wall surface by wiping or flushing the nozzle plate, and even suction cleaning is not able to sufficiently eliminate the resin. In addition, there is a problem in that the drying of the ink composition proceeds and the clogging occurs in the same manner even in the ink jet head which is left to stand when the printing is stopped.

This problem is closely related to ease of the resin becoming adhered. From the viewpoint of abrasion resistance of the recorded matter, it is desirable that the resin is easily adhered to the recorded matter. Therefore, there is a trade-off relationship between improvement in abrasion resistance and improvement in resistance to clogging in the head, making it difficult to achieve both. In addition, in particular, the problem is also solved by a water-based ink composition having a content of an organic solvent having a standard boiling point of 280° C. or more of 0.5% by mass or less, that is, a water-based ink composition which includes hardly any or no high-boiling solvent.

With respect thereto, the inventors of the invention found that, by preparing an ink composition such that the contact angle of the ink composition with respect to the material with an SP value of 9 or less defined as the material used in the member in the head is 30° or less, even in a case where the composition of the ink composition is changed due to the drying of the ink composition and the resin particles are aggregated and adhered to the inner wall of the constituent members of the head, it is possible to easily remove the adhered resin and to eliminate nozzle clogging.

The reasons why the cleanability of the adhered resin is better as the contact angle of the ink with respect to the member in the head is lower are presumed to be as follows: 1) since the lower the contact angle, the more the adhered resin spreads, the contact area with new ink is great and the adhered resin is easily re-dissolved and removed in the ink, 2) since the lower the contact angle, the more the adhered resin spreads and the more the resin film is thinned, the adhered resin is easily re-dissolved and removed in the new ink, and 3) when the adhered resin film is thinned, the ink flow path is not blocked and discharge to the outside is easy by suction cleaning.

Here, even with the ink with a good wetting and spreading property to the recording medium, that is, an ink having a sufficiently low contact angle with respect to the surface of the recording medium, the contact angle with respect to the member in the head with a different material from the recording medium is not sufficiently low, and the problem of clogging described above occurs. Therefore, in the present embodiment, the ink composition is defined from the viewpoint of the contact angle of the ink to the head member in order to enhance the removability (cleanability) of the adhered resin in the head. The specific means for satisfying the contact angle is the type and content of the surfactant, and the like; however, the contact angle of the ink to the head member is what is essential without being limited to the ink composition.

In consideration of the ink resistance and ease of head mass production, the material of the portion in contact with ink in the head is often made using an inorganic-based material, and often has an SP value of 9 or less. In this case, the problems described above occurred. On the other hand, generally, resinous materials often have an SP value exceeding 9; however, these are presumed not to have the problem of the invention because the contact angle of ink tends to be intrinsically low. However, even with organic-based members, if the SP value is 9 or less, it is presumed that the effect can be obtained if the predetermined contact angle is satisfied.

In addition, according to the present embodiment, in addition to being able to suppress nozzle clogging, by using a water-based ink composition having a content of an organic solvent having a standard boiling point of 280° C. or more of 0.5% by mass or less, it is possible to improve the drying property of the ink, the resin is easily formed into a film on the recording medium, and it is possible to improve the abrasion resistance.

Due to this, in the present embodiment, it is possible to suppress head clogging and form an image with excellent abrasion resistance.

Description will be given below of the ink composition used in the ink jet method of the present embodiment and an ink jet method using this ink composition.

Ink Composition

The ink composition of the present embodiment is a water-based ink composition having a content of an organic solvent having a standard boiling point of 280° C. or more of 0.5% by mass or less, in which a contact angle between at least a part of the surface in contact with the water-based ink composition in the member in the head and the water-based ink composition is 30° or less.

Description will be given of each component which is able to be included in the ink composition below.

Coloring Material

It is possible to use a pigment or dye as a coloring material; however, a pigment is preferably used. The pigment is not particularly limited and examples thereof include the following.

The black pigment is not particularly limited and examples thereof include No. 2300, No. 900, MCF 88, No. 33, No. 40, No. 45, No. 52, MA 7, MA 8, MA 100, No. 2200B, and the like (the above are manufactured by Mitsubishi Chemical Corporation), Raven 5750, Raven 5250, Raven 5000, Raven 3500, Raven 1255, Raven 700, and the like (the above are manufactured by Carbon Columbia Co., Ltd.), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (manufactured by Cabot Japan K.K.), Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, and Special Black 4 (manufactured by Degussa AG).

The white pigment is not particularly limited and examples thereof include white inorganic pigments of C.I. Pigment White 6, 18, 21, titanium oxide, zinc oxide, zinc sulfide, antimony oxide, magnesium oxide, and zirconium oxide. In addition to the white inorganic pigment, it is also possible to use a white organic pigment such as white hollow resin particles and polymer particles.

The pigment used in the yellow ink is not particularly limited and examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The magenta pigment is not particularly limited and examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57: 1, 88, 112, 114, 122, 123, 144, 146, 149, 150, 166, 168, 170, 171, 175, 176, 177, 178, 179, 184, 185, 187, 202, 209, 219, 224, 245 or C.I. Pigment Violet 19, 23, 32, 33, 36, 38, 43, and 50.

The cyan pigment is not particularly limited and examples thereof include C.I. Pigment Blue 1, 2, 3, 15, 15: 1, 15: 2, 15: 3, 15: 34, 15: 4, 16, 18, 22, 25, 60, 65, 66, C.I. Bat Blue 4, and 60.

In addition, the pigments used for color inks other than magenta, cyan, and yellow are not particularly limited, and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, and 63.

The pearl pigment is not particularly limited, and examples thereof include pigments having a pearly luster and interference gloss such as titanium dioxide-coated mica, fish scale foil, bismuth oxychloride, and the like.

The metallic pigments are not particularly limited and examples thereof include particles formed of a single substance such as aluminum, silver, gold, platinum, nickel, chromium, tin, zinc, indium, titanium, and copper, or an alloy.

The content of the pigment is preferably 0.4 to 12% by mass with respect to 100% by mass of the ink composition, more preferably 1 to 8% by mass, and even more preferably 2 to 5% by mass.

Resin Particles

The ink composition of the present embodiment includes resin particles for improving the abrasion resistance of the image.

The resin is not particularly limited and examples thereof include homopolymers or copolymers of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinylcarbazole, vinylimidazole, and vinylidene chloride, fluororesins, and natural resins. Among the above, at least one from among a (meth)acrylic-based resin and a styrene-(meth)acrylic acid copolymer-based resin is preferable, and at least one from among an acrylic-based resin and a styrene-acrylic acid copolymer-based resin is more preferable, and a styrene-acrylic acid copolymer-based resin is even more preferable. Here, the copolymer described above may be in any form of a random copolymer, a block copolymer, an alternating copolymer, and a graft copolymer.

The resin described above is not particularly limited and it is possible to obtain the resin, for example, by the following preparation method, and a plurality of methods may be combined as necessary. Examples of the preparation method include a method in which a polymerization catalyst (polymerization initiator) and a dispersant are mixed in a monomer of a component for forming a desired resin and polymerized (emulsion polymerization), a method in which a solution obtained by dissolving a resin having a hydrophilic part in a water-soluble organic solvent is mixed in water and then the water-soluble organic solvent is removed by distillation or the like, and a method of mixing a solution obtained by dissolving a resin in a water-insoluble organic solvent with a dispersant in a water-based solution.

The content of the resin is preferably 0.5% by mass or more and 10% by mass or less with respect to the total amount of the ink composition, more preferably 2% by mass or more and 7% by mass or less, and even more preferably 3% by mass or more and 5% by mass or less. This is because the problem of the invention tends to occur in a case where the content of the resin is 0.5% by mass or more in order to improve the abrasion resistance with respect to the recording medium.

Water

The ink composition of the present embodiment includes water. Examples of water include water from which ionic impurities are removed as much as possible such as pure water and ultrapure water such as ion exchanged water, ultra-filtered water, reverse osmosis water, distilled water, and the like. In addition, when water sterilized by ultraviolet irradiation or addition of hydrogen peroxide is used, it is possible to prevent the generation of mold and bacteria in a case where the pigment dispersion and the ink using the same are stored for long periods.

The water content is not particularly limited, but the invention is a so-called "water-based ink" which includes more water content than the solvent (organic solvent) described below.

Solvent

The ink composition of the present embodiment includes a solvent (organic solvent).

The solvent is not particularly limited and examples thereof include alcohols such as methanol, ethanol, and isopropyl alcohol; ketones or keto alcohols such as acetone and diacetone alcohol; ethers such as tetrahydrofuran and dioxane; glycols of hexanediol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols of ethylene glycol monomethyl ether, diethylene glycol monomethyl ether, diethylene glycol monoethyl ether, and diethylene glycol monobutyl ether; amines having a hydroxyl group such as diethanolamine and triethanolamine; glycerine, 2-pyrrolidone, and N-methylpyrrolidone. Among these, 2-pyrrolidone and 1,2-hexanediol are preferable from the viewpoint of obtaining recorded matter excellent in abrasion resistance.

The ink composition of the present embodiment preferably includes an organic solvent having a standard boiling point of 260° C. or less, more preferably includes an organic solvent having a standard boiling point of 160 to 260° C., and even more preferably includes an organic solvent having a standard boiling point of 180 to 240° C. The boiling point of the other solvent being within the above range makes it possible to improve the drying property of the ink composition and to form an image excellent in abrasion resistance. In addition, the intermittent characteristics tend to be further improved.

The total amount of the solvent is preferably 5.0% by mass or more and 30% by mass or less with respect to the total amount of the ink, more preferably 10% by mass or more and 25% by mass or less, and even more preferably 15% by mass or more and 20% by mass or less.

Solvent with Boiling Point of 280° C. or More

In the ink composition of the present embodiment, the content of the organic solvent having a standard boiling point of 280° C. or more is 3% by mass or less. In addition, the content is preferably 2% by mass or less, more preferably 1% by mass or less, and particularly preferably 0.5% by mass or less. When the ink composition includes an organic solvent having a standard boiling point of 280° C. or more, the drying property of the ink on the recording medium is greatly decreased. As a result, in various recording media, particularly ink non-absorbing or low absorbing recording media, not only is the density unevenness of the image conspicuous, but it is also not possible to obtain ink fixability.

The content of the organic solvent having a standard boiling point of 280° C. or more in the ink composition is preferably 0% by mass or more and less than 0.1% by mass with respect to the total mass of the ink composition, more preferably 0% by mass or more and less than 0.05% by mass, even more preferably 0% by mass or more and less than 0.01% by mass, and most preferably 0% by mass or more and less than 0.001% by mass. By the content being in the range described above, the decreases in the abrasion resistance of the recorded matter using the ink composition by the organic solvent having a standard boiling point of 280° C. or more are suppressed and it is possible to obtain recorded matter having a superior abrasion resistance. In addition, in particular, the content of the organic solvent having a standard boiling point of more than 260° C. is more preferably within the above-mentioned range for the points described above.

Surfactant

The ink composition of the present embodiment preferably includes a surfactant having an HLB value of 8 to 16. Due to this, it is possible to adjust the contact angle of the water-based ink composition with respect to at least a part of the surface in contact with the water-based ink composition in the member in the head to 30° or less. The surfactant is not particularly limited, and examples thereof include acetylene glycol-based surfactants, fluorine-based surfactants, and silicone-based surfactants. Among these, a fluorine-based surfactant and a silicone-based surfactant are preferable. Using these surfactants to adjust the contact angle of the water-based ink composition with respect to the surface in contact with the water-based ink composition in the member in the head to 30° or less makes it possible to easily remove the adhered resin even in a case where the resin is adhered to the inner wall of the head. The HLB value of the surfactant is more preferably 9 to 14, and even more preferably 10 to 13. The HLB value is an abbreviation of hydrophile-lipophile balance and is a value defined by Griffin's method.

The acetylene glycol-based surfactant is not particularly limited and examples thereof preferably include one type or more selected from 2,4,7,9-tetramethyl-5-decyne-4,7-diol and alkylene oxide adducts of 2,4,7,9-tetramethyl-5-decyne-4,7-diol, and 2,4-dimethyl-5-decyne-4-ol and alkylene oxide adducts of 2,4-dimethyl-5-decyn-4-ol. Commercial products of acetylene glycol-based surfactants are not particularly limited, and examples thereof include the Olfine 104 series and Olfine E1010 series (trade names manufactured by Air Products Japan, Inc.), Surfynol 465, Surfynol 61, and Surfynol DF 110D (trade names, manufactured by Nissin Chemical Industry Co., Ltd.), and the like. The acetylene glycol-based surfactant may be used alone as one type or in a combination of two or more types thereof.

The fluorine-based surfactant is not particularly limited, and examples thereof include perfluoroalkyl sulfonate, perfluoroalkyl carboxylate, perfluoroalkyl phosphate ester, perfluoroalkyl ethylene oxide adduct, perfluoroalkyl betaine, and perfluoroalkyl amine oxide compounds. Commercially available fluorine-based surfactants are not particularly limited and examples thereof include S-144, and S-145 (manufactured by Asahi Glass Co., Ltd.); FC-170C, FC-430, Fluorad-FC 4430 (manufactured by Sumitomo 3M Limited); FSO, FSO-100, FSN, FSN-100, and FS-300 (manufactured by Dupont); FT-250, and 251 (manufactured by Neos Co., Ltd.). The fluorine-based surfactant may be used alone as one type or in a combination of two or more types thereof.

Examples of silicone-based surfactants include a polysiloxane-based compound, a polyether modified organosiloxane, and the like. Commercially available silicone-based surfactants are not particularly limited and specific examples thereof include BYK-306, BYK-307, BYK-333, BYK-341, BYK-345, BYK-346, BYK-347, BYK-348, and BYK-349, (the above are trade names, manufactured by BYK Additives and Instruments), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.), and the like.

The content of the surfactant is preferably 0.5% by mass or more with respect to 100% by mass of the ink composition, more preferably 0.5 to 2.0% by mass, and even more preferably 0.5 to 1.5% by mass. In addition, by the content of the surfactant being 0.5% by mass or more, it is possible to adjust the contact angle of the water-based ink composition with respect to the surface in contact with the water-based ink composition in the member in the head to 30° or less, and it is possible to improve the cleanability of the resin adhered inside the head. By the content of the surfactant being 2.0% by mass or less, the abrasion resistance tends to be further improved.

Other Components

In order to favorably maintain the storage stability and ejection stability from the head of the ink used in the present embodiment, to improve clogging, or to prevent deterioration of the ink, it is also possible to appropriately add various additives such as a defoaming agent, a solubilizing agent, a viscosity adjusting agent, a pH adjusting agent, an antioxidant, a preservative, an anti-fungal agent, a corrosion inhibitor, and a chelating agent for capturing metal ions affecting dispersion.

Physical Properties of Ink Composition

The ink composition according to the present embodiment has a contact angle of 30 degrees or less with respect to the material with an SP value of 9 or less, more preferably 25 degrees or less, and even more preferably 20 degrees or less. Due to this, even in a case where the composition of the ink composition is changed due to the drying of the ink composition and the resin particles are aggregated and adhered to the inner wall of the constituent member of the head, it is possible to obtain excellent ejection stability. It is presumed that the reason why it is possible to obtain excellent ejection stability is that deposited matter such as the adhered resin is easily thinned, the adhered resin tends to be easily peeled off, and it is possible to improve the ejection stability. In addition, it is presumed that there is a tendency for the thickness of the deposited matter of the ink adhered to the inner wall to become relatively thin, the deposited matter does not hinder the ink from passing through the head, the ink flows easily, and the ink is easily ejected. Although the lower limit of the contact angle is not limited, the contact angle is preferably 5 degrees or more, and more preferably 10 degrees or more from the viewpoint of easily obtaining such a contact angle.

The surface tension of the ink composition is preferably 27 mN/m or less, more preferably 26 mN/m or less, and even more preferably 24 mN/m or less. Due to this, it is possible to increase the wettability to the base material, and to improve the filling and coloring property. In addition, by increasing the wettability, the dot diameter widens, the drying efficiency increases, and the abrasion resistance improves. Here, it is possible to measure the surface tension by wetting a platinum plate with ink in an environment of 20° C. using an automatic surface tensiometer CBVP-Z (manufactured by Kyowa Interface Science Co., Ltd.).

The contact angle of the ink composition with respect to the base material formed by forming the coating film of the ink composition on the member of the head is preferably 25° or less. Due to this, in a case where the coating film of the ink composition is adhered to the inner wall of the head, the generation of lumps of the adhered resin with the coating film as a starting point is suppressed, and it is possible to improve the cleanability of the resin adhered to the inner wall of the head.

The physical properties of the ink composition described above are adjusted mainly according to the blend of the surfactant and the amount thereof.

Ink Jet Head

FIG. 1 is a schematic diagram of an ink jet head used in the ink jet method of the present embodiment. The ink jet head 2 of the present embodiment is provided with a pressure chamber 21, and a piezoelectric element 23 which applies pressure to the pressure chamber 21 to eject the ink composition from the nozzle 22, in which, in the pressure chamber 21, the piezoelectric element 23 is arranged at a location other than a position opposing the outlet 24 communicating with the nozzle 22. In a case where the piezoelectric element 23 is provided directly above the nozzle 22, since the extrusion force of the ink from the piezoelectric element 23 is also transmitted to the adhered resin 25 more directly, it is possible to eliminate the adhesion of the resin; however, the present embodiment is particularly useful since the adhesion of the resin is difficult to eliminate in a case where the piezoelectric element 23 is not provided directly on the nozzle 22. In FIG. 1, in a case where virtual lines extend from the walls of the outlet 24 toward the top of the diagram, the position opposing the outlet 24 communicating with the nozzle 22 in the pressure chamber 21 is the extended lines and the region in the middle surrounded by the extended lines. For example, the outlet 24 in the head in FIG. 1 has the same area as the nozzle 22 in the direction orthogonal to the direction in which ink is ejected and is not widened in the middle. Arranging the piezoelectric element 23 at a location other than this position means that at least a part of the piezoelectric element 23 is not present in at least a part of this region.

A plurality of cavities and ejection driving portions and nozzles provided for each cavity may be provided independently from each other in one head. It is possible to form the ejection driving portion by using an electromechanical conversion element such as a piezoelectric element which changes the volume of the cavity by mechanical deformation, an electrothermal transducer element which generates bubbles in the ink by emitting heat and ejects the ink, and the like.

When the solvent and moisture in the ink composition volatilize from the nozzle, the composition in the ink composition is changed, and the resin dispersed in the ink aggregates and is adhered to the inner wall of the cavity as shown in FIG. 1. The adhesion of such a resin hinders the movement of the ink composition in the cavity, and as a result causes a phenomenon that the ink is not ejected normally. With respect thereto, using the ink composition of the present embodiment makes it possible to improve the cleanability of the resin attached to the inner wall of the cavity for the reasons described above.

In the present embodiment, at least a part of the surface of the member in contact with the water-based ink composition is formed of a material having an SP value of 9 or less. Specifically, a part of the surface is, for example, the surface of the pressure chamber 21 in FIG. 1. The material is formed of, for example, an inorganic material. Examples of the inorganic materials include metals, semiconductors such as silicon, inorganic compounds such as oxides and nitrides derived from the metals and semiconductors described above, and the like. Examples of the inorganic compounds include silicon dioxide, silicon nitride, aluminum oxide, titanium oxide, tantalum oxide, and the like. The inorganic compound is preferably an insulator. From the viewpoints of ink resistance and the like, it is preferable to use inorganic materials as the constituent members in the head, and many inorganic materials have an SP value of 9 or less. The invention is useful in a case where the surface of the member in contact with the ink composition is formed of an inorganic material. However, even if the surface of the member in contact with the ink composition is formed of an organic material, the effect of the invention is obtained if the SP value is 9 or less. The lower limit of the SP value is not limited, but is preferably 6 or more, more preferably 7 or more, and even more preferably 7.5 or more in terms of the availability of materials and the like.

In addition, as a material having an SP value of 9 or less, an organic material may be used as long as the organic material satisfies the SP value. Examples of the organic material include resins such as a fluorine-based resin, a silicone resin, polyethylene, and the like, and it is possible to use a material satisfying the SP value described above among these.

Examples of the surface of the member in contact with the water-based ink composition described above include at least a part of the inner wall surface of the pressure chamber, the flow path through which the ink flows from the pressure chamber to the nozzle, and the flow path for supplying the ink to the pressure chamber. The inner wall of the pressure chamber is preferable from the viewpoint of improvement in clogging resistance and the like.

Here, description will be given of the SP value in the aspect of the invention. Hansen's solubility parameter is used as the SP value. Hansen's solubility parameter is obtained by dividing the solubility parameter introduced by Hildebrand into three components of a dispersion term δd, a polar term δp, and a hydrogen bonding term δh, and is expressed in a three-dimensional space, and, in the aspect of the invention, the SP value is expressed by $\delta\ [(cal/cm^3)^{0.5}]$ and the value calculated using the following equation is used.

$$\delta[(cal/cm^3)^{0.5}]=(\delta d^2+\delta p^2+\delta h^2)^{0.5}$$

Here, the dispersion term δd, the polar term δp, and the hydrogen bond term δh have been further determined by Hansen and subsequent researchers, and are published in detail in the Polymer Handbook (Fourth Edition), VII-698 to 711. In addition, the values of the Hansen's solubility parameter have been investigated for many solvents and resins, for example, as described in Wesley L. Archer et al., Industrial Solvents Handbook.

Ink Jet Recording Method

The ink jet method of the present embodiment has an attaching step of ejecting the ink composition from a nozzle of the ink jet head and attaching the ink composition to a recording medium. Due to this, it is possible to suppress head clogging and to form an image excellent in abrasion resistance. An ink jet recording method is one example of an ink jet method.

Attaching Step

The upper limit of the surface temperature of the recording medium in the attaching step is preferably 45° C. or less, more preferably 40° C. or less, and most preferably 38° C. or less. The lower limit of the surface temperature of the recording medium in the attaching step is preferably 20° C. or more, more preferably 25° C. or more, even more preferably 30° C. or more, and particularly preferably 32° C. or more. Due to this, radiation heat received from the platen is reduced or eliminated, thus, it is possible to suppress drying and composition changes in the ink composition in the ink jet head and the resin is prevented from being adhered to the inner wall of the head.

A step of attaching a reaction solution including an aggregating agent for aggregating the components of the ink composition to the recording medium may be provided before attaching the ink composition. Due to this, it is possible to lower the temperature of the recording medium in the attaching step.

In the reaction solution attaching step, a reaction solution containing at least one type out of a polyvalent metal compound, an organic acid, and a cationic resin is attached to a recording medium. All of the polyvalent metal compound, the organic acid, and the cationic resin included in the reaction solution have a function of reacting with a pigment included in the ink composition, a pigment dispersed resin which can be included in the ink composition, or the like to aggregate the pigment. Due to this, it is possible to suppress the generation of bleeding or the like of the image recorded by using the ink composition and to obtain an image with excellent image quality. As other components of the reaction solution, it is preferable to include water as in the preferable aspect in the ink composition. Furthermore, as other components, components which are able to be contained in an ink composition may be contained. However, the content of the coloring material is preferably 0.3% by mass or less with respect to the reaction solution. In the case where the recording method is provided with a reaction solution attaching step, it is presumed that a part of the reaction solution is attached to the nozzles which eject the ink during the recording, and aggregates of the components of the ink are also generated, which is a particular cause of the generation of ink ejection defects. The present embodiment is particularly useful in a case where the recording method is provided with a reaction solution attaching step from the viewpoint that it is possible to reduce ejection defects and to obtain an excellent image quality.

Drying Step

The ink jet method of the present embodiment may have a drying step of drying the recording medium to which the ink composition is attached after the ejecting step described above. Due to this, the resin included in the ink composition on the recording medium melts and is able to form recorded matter with a good filling property. At this time, the temperature of the recording medium in the drying step is preferably 70° C. or more, more preferably 70° C. or more and 120° C. or less, and even more preferably 80° C. or more and 100° C. or less. By the drying temperature being within the range described above, the abrasion resistance tends to be further improved.

The ink jet method according to the present embodiment may be provided with a maintenance step of discharging the ink composition by another mechanism that is not a mechanism for ejecting ink for recording provided in the ink jet head. Examples of a mechanism for ejecting ink for recording provided in the ink jet head include a piezo element provided in a pressure chamber and applying pressure to the ink or a heater element. The maintenance step may be a step of externally applying pressure to the ink jet head to discharge the ink composition from the nozzle. By providing this step, even in a case where there is a concern that the resin will be adhered to the inner wall of the ink jet head, it is possible to suppress this and it is possible to further improve the clogging property.

In addition, in the ink jet method according to the present embodiment, it is preferable to perform recording for 1 hour or more without performing the above maintenance step. By doing so, the recording speed is not reduced by interrupting the recording along with the above step, which is preferable. Even in such a case, by using the ink composition described above, it is possible to suppress clogging of the ink jet head and to record an image having abrasion resistance on the recording medium. Here, as another mechanism described above, there is a mechanism for applying pressure, such as the application of suction (negative pressure), the application of positive pressure from upstream of the head, or the like. This discharge is not ink discharge (flushing) according to a function of the head itself. In other words, this discharge is not a discharge using the function of ejecting ink from the head during recording. Here, the recording time need not be continuous but may be paused unless pressure is being externally applied to the ink jet head to discharge the ink composition from the nozzle. The recording time includes the recording and stop time between recordings. The recording time is preferably 1 hour or more, more preferably 1.5 hours or more, and even more preferably 2 hours or more. Although the upper limit of the recording time is not limited, the upper limit is preferably 10 hours or less, more preferably 5 hours or less, and even more preferably 4 hours or less.

In addition, in the ink jet method according to the present embodiment, the maintenance step described above is not performed during recording during one instance of recording, which is preferable in terms of the above. In addition, it is preferable if the maintenance step described above is performed at least either before recording or after recording in view of the above points.

Ink Jet Recording Apparatus

The ink jet recording apparatus of the present embodiment is provided with the ink jet head described above and a control portion which controls each portion of the head, and ejects the ink composition described above from the nozzle of the ink jet head so as to be attached to the recording medium. Due to this, it is possible to suppress head clogging and to form an image excellent in abrasion resistance. In addition, it is possible to provide an ink jet recording apparatus which performs recording by the above ink jet recording method. The ink jet recording apparatus also performs a control method in which control of each portion such as an ink jet head is carried out by the above control portion so as to perform the above-described ink jet recording method. When carrying out recording by the above-described ink jet recording method, the control portion is able to perform a control method of performing control to perform recording for 1 hour or more as the above-described time without performing the maintenance step described above. Specifically, for example, it is sufficient if the control portion monitors the timer and performs control to prompt each portion to cause the maintenance step to be performed in a case where the time reaches a predetermined time or it is expected that the time will be reached. In addition, the control method may control each portion of the ink jet recording apparatus so as to perform the ink jet recording method described above.

Recording Medium

The recording medium used in the recording method of the present embodiment is not particularly limited, and examples thereof include an absorbent recording medium, a non-absorbing recording medium, or a low-absorbing recording medium. Among these, it is preferable to use a non-absorbing recording medium or a low-absorbing recording medium, and it is more preferable to use a non-absorbing recording medium. With the non-absorbing recording medium or the low-absorbing recording medium, the filling property due to cissing of the water-based ink composition tends to decrease to the extent that the recording medium is low-absorbing or non-absorbing. Therefore, it is advantageous to use the recording method according to the present embodiment for such a recording medium.

Here, the "low-absorbing recording medium" or "non-absorbing recording medium" refers to a recording medium having a water absorption amount of 10 mL/m$^2$ or less from the start of contact to 30 seconds therefrom in the Bristow method. This Bristow method is the most popular method as a method for measuring the amount of liquid absorption in a short time and is also adopted by the Japan Technical Association of the Pulp and Paper Industry (JAPAN TAPPI). For details of the test method, please refer to the standard No. 51 "Paper and paperboard-Liquid absorbency test method-Bristow method" of "JAPAN TAPPI 2000 Paper Pulp Test Method".

In addition, it is possible to classify the non-absorbing recording medium or the low-absorbing recording medium according to the wettability with respect to water on the recording surface. For example, by dropping 0.5 μL of water droplets on the recording surface of the recording medium and measuring the decrease rate of the contact angle (comparison between the contact angle at 0.5 msec after landing and the contact angle at 5 sec), it is possible to impart characteristics to the recording medium. More specifically, as a property of the recording medium, the non-absorption of the "non-absorbing recording medium" means that the decrease rate described above is less than 1%, and the low absorption of the "low-absorbing recording medium" means that the decrease rate is 1% or more and less than 5%. In addition, the absorbability means that the decrease rate described above is 5% or more. Here, it is possible to measure the contact angle using a portable contact angle meter PCA-1 (manufactured by Kyowa Interface Science Co., Ltd.) or the like.

The low-absorbing recording medium is not particularly limited and examples thereof include a coated paper provided with a coating layer for receiving an oil-based ink on the surface thereof. The coated paper is not particularly limited and examples thereof include recorded paper such as art paper, coated paper, matte paper, and the like.

The non-absorbing recording medium is not particularly limited and examples thereof include a plastic film not having an ink absorbing layer, a medium where a base material such as paper is coated with plastic, a medium bonded with a plastic film, and the like. Here, examples of plastics include polyvinyl chloride, polyethylene terephthalate, polycarbonate, polystyrene, polyurethane, polyethylene, polypropylene, and the like.

In addition to the above-described recording medium, it is also possible to use a non-ink absorbing or low absorbing recording medium such as a plate of a metal such as iron, silver, copper, or aluminum, glass, or the like.

Figure 2:
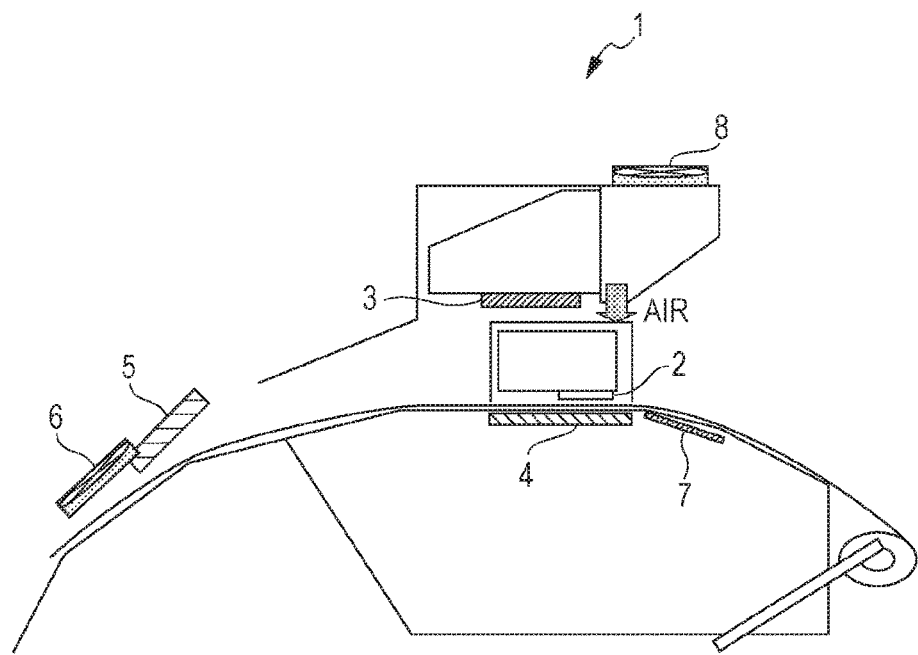
FIG. 2 is a schematic diagram of a recording apparatus used for the recording method of the present embodiment.

FIG. 2 is a schematic cross-sectional diagram of an ink jet apparatus used in the ink jet method according to the present embodiment. As shown in FIG. 2, the ink jet apparatus 1 includes an ink jet head 2, an IR heater 3, a platen heater 4, a curing heater 5, a cooling fan 6, a preheater 7, and a ventilation fan 8. The ink jet head 2 ejects the ink composition to the recording medium, and it is possible to use an ink jet head of the type shown in FIG. 1.

The recording apparatus shown in FIG. 2 is provided with an IR heater 3 and a platen heater 4 for heating the recording medium at the time of ejecting the ink composition from the recording head 2. At the time of heating the recording medium in the step of attaching the ink composition, at least one of the IR heater 3 and the platen heater 4 may be used.

When the IR heater 3 is used, it is possible to heat the recording medium from the recording head 2 side. Due to this, although the recording head 2 is also easily heated at the same time, it is possible to increase the temperature without being affected by the thickness of the recording medium, in comparison with a case where heating is carried out from the rear side of the recording medium such as the platen heater 4. In addition, when the platen heater 4 is used, it is possible to heat the recording medium from the side opposite to the recording head 2 side. This makes it relatively difficult for the recording head 2 to be heated. However, as described above, the temperature of the recording medium is preferably set to 38° C. or less by the IR heater 3 and the platen heater 4, more preferably 35° C. or less, and even more preferably set to room temperature without operation. Due to this, since the radiation heat received from the IR heater 3 and the platen heater 4 is reduced or eliminated, it is possible to suppress drying and composition changes in the ink composition in the recording head, and to suppress the resin from being adhered to the inner wall of the head.

The curing heater 5 is for drying and solidifying the ink composition recorded on the recording medium. By the curing heater 5 heating the recording medium on which the image is recorded, moisture or the like included in the ink composition evaporates more rapidly and a film is formed by the polymer particles included in the ink composition. In this manner, it is possible to firmly fix (attach) the ink-dried material on the recording medium, and to obtain a high-quality image with excellent abrasion resistance in a short time. The drying temperature according to the curing heater 5 is preferably 40° C. to 120° C., more preferably 60° C. to 100° C., and even more preferably 80° C. to 90° C.

The recording apparatus 1 may have a cooling fan 6. After drying, by cooling the ink composition on the recording medium with the cooling fan 6, there is a tendency for it to be possible to form a film with good adhesion on the recording medium.

In addition, the recording apparatus 1 may be provided with a preheater 7 for heating (preheating) the recording medium in advance before the ink composition is ejected onto the recording medium. Furthermore, the recording apparatus 1 may be provided with the ventilation fan 8 such that the ink composition attached to the recording medium is more efficiently dried.

EXAMPLES

More specific description will be given below of aspects of the invention using Examples and Comparative Examples. The invention is not at all limited by the following examples.

Preparation of Ink Composition

Each of the materials was mixed in the composition (mass %) shown in the following Table 1 and sufficiently stirred to obtain the ink compositions of the Examples, Comparative Examples, and Reference Examples.

TABLE 1

|  | Surfactant HLB Value | Standard Boiling Point ° C. | Ink 1 | Ink 2 | Ink 3 | Ink 4 | Ink 5 |
|---|---|---|---|---|---|---|---|
| PB15:3 |  |  | 4% | 4% | 4% | 4% | 4% |
| 1,2-hexanediol |  | 224 | 5% | 5% | 5% | 5% | 5% |
| 2-pyrrolidone |  | 245 | 10% | 10% | 10% | 10% | 10% |
| Glycerine |  | 290 |  |  |  |  |  |
| Surfactant A BYK348 | 11 |  | 1% |  |  |  |  |
| Surfactant B SAG503A | 11 |  |  | 1% |  |  |  |
| Surfactant C E4200 | 10~13 |  |  |  | 1% |  |  |
| Surfactant D Olfine E1010 | 13~14 |  |  |  |  | 1% |  |
| Surfactant E E1020 | 15~16 |  |  |  |  |  | 1% |
| Surfactant F Olfine PD002W | 9~10 |  |  |  |  |  |  |
| Surfactant G Surflon S145 | 13 |  |  |  |  |  |  |
| DF110D | 3 |  | 0.50% | 0.50% | 0.50% | 0.50% | 0.50% |
| Styrene acrylic resin Tg80 |  |  | 5% | 5% | 5% | 5% | 5% |
| Pure water |  |  | Remainder | Remainder | Remainder | Remainder | Remainder |
| Total |  |  | 100 | 100 | 100 | 100 | 100 |
| Surface tension |  |  | 24.5 | 23.1 | 26.1 | 26.8 | 30.1 |

|  | Ink 6 | Ink 7 | Ink 8 | Ink 9 | Ink 10 | Ink 11 | Ink 12 |
|---|---|---|---|---|---|---|---|
| PB15:3 | 4% | 4% | 4% | 4% | 4% | 4% | 4% |
| 1,2-hexanediol | 5% | 5% | 5% | 5% | 2% | 2% | 5% |
| 2-pyrrolidone | 10% | 10% | 10% | 10% | 7% | 7% | 10% |
| Glycerine |  |  |  |  | 5% | 5% |  |
| Surfactant A BYK348 |  | 3% |  |  | 1% |  | 0.3% |

TABLE 1-continued

| | | | | | | | |
|---|---|---|---|---|---|---|---|
| Surfactant B SAG503A | | | 3% | | | | |
| Surfactant C E4200 | | | | | | | |
| Surfactant D Olfine E1010 | | | | | | | |
| Surfactant E E1020 | | | | | | | |
| Surfactant F Olfine PD002W | 1% | | | | | 1% | |
| Surfactant G Surflon S145 | | | | 1% | | | |
| DF110D | 0.50% | 0.50% | 0.50% | 0.50% | 0.50% | 0.50% | 0.50% |
| Styrene acrylic resin Tg80 | 5% | 5% | 5% | 5% | 5% | 5% | 5% |
| Pure water | Remainder | Remainder | Remainder | Remainder | Remainder | Remainder | Remainder |
| Total | 100 | 100 | 100 | 100 | 100 | 100 | 100 |
| Surface tension | 22.2 | 22.3 | 22.2 | 19.1 | 25.5 | 23.5 | 28 |

Surface Tension Test

The "surface tension" shown in Table 1 is a value obtained by measuring the surface tension when the platinum plate was wetted with ink in an environment of 20° C. using an automatic surface tensiometer CBVP-Z (manufactured by Kyowa Interface Science Co., Ltd.).

In addition, in the present example, a reaction solution having the composition shown in Table 2 was used as the reaction solution. As the cationic polymer A, a polyallylamine polymer was used.

TABLE 2

| | Reaction solution |
|---|---|
| Calcium acetate | 1% |
| 1,2-hexanediol | 5% |
| 2-pyrrolidone | 10% |

TABLE 2-continued

| | Reaction solution |
|---|---|
| BYK348 | 1% |
| Cation polymer A | 5% |
| Pure water | Remainder |
| Total | 100 |

As shown in Table 3, with respect to each ink composition, recording was carried out by changing the conditions of the recording test and the head configuration, and the cleanability, the contact angle, the contact angle to the base material with the dry film, the coloring property, the abrasion resistance, the clogging property, the continuous printing, and the filling were evaluated. Description will be given below of the conditions of the recording test, the configuration of the head, and details of each evaluation test.

TABLE 3

| | Example 1 | Example 2 | Example 3 | Example 4 | Example 5 | Comparative Example 1 | Example 6 | Example 7 | Example 8 | Comparative Example 2 |
|---|---|---|---|---|---|---|---|---|---|---|
| First step (preprocessing) | None | None | None | None | None | None | None | None | None | None |
| Second step (ink coating) | Ink 1 | Ink 2 | Ink 3 | Ink 4 | Ink 5 | Ink 6 | Ink 7 | Ink 8 | Ink 9 | Ink 10 |
| Primary drying temperature (° C.) | 35 | 35 | 35 | 35 | 35 | 35 | 35 | 35 | 35 | 35 |
| Base material SP | 7.8 | 7.8 | 7.8 | 7.8 | 7.8 | 7.8 | 7.8 | 7.8 | 7.8 | 7.8 |
| Head structure type | Head 1 | Head 1 | Head 1 | Head 1 | Head 1 | Head 1 | Head 1 | Head 1 | Head 1 | Head 1 |
| Cleanability | 1 | 1 | 2 | 2 | 1 | 3 | 1 | 1 | 1 | 1 |
| Contact angle | 22 | 18 | 23 | 24 | 25 | 31 | 21 | 17 | 16 | 22 |
| Contact angle with respect to base material with dry film | 21 | 15 | 20 | 21 | 26 | 30 | 20 | 15 | 14 | 21 |
| Coloring property | B | A | B | B | C | A | A | A | A | B |
| Abrasion resistance | A | A | A | A | B | B | A | A | A | C |
| Clogging property | A | A | B | B | A | C | A | A | A | A |
| Continuous printing | A | A | B | B | B | C | A | A | A | A |
| Filling | A | A | A | A | C | B | A | A | A | A |

TABLE 3-continued

|  | Comparative Example 3 | Example 9 | Example 10 | Comparative Example 4 | Example 11 | Example 12 | Reference Example 1 | Reference Example 2 | Reference Example 3 |
|---|---|---|---|---|---|---|---|---|---|
| First step (preprocessing) | None | None | Reaction solution | None | None | None | None | None | None |
| Second step (ink coating) | Ink 11 | Ink 12 | Ink 1 | Ink 6 | Ink 1 | Ink 1 | Ink 6 | Ink 1 | Ink 6 |
| Primary drying temperature (° C.) | 35 | 35 | 35 | 25 | 40 | 35 | 35 | 35 | 35 |
| Base material SP | 7.8 | 7.8 | 7.8 | 7.8 | 7.8 | 8.5 | 7.8 | 9.5 | 9.5 |
| Head structure type | Head 1 | Head 1 | Head 1 | Head 1 | Head 1 | Head 1 | Head 2 | Head 1 | Head 1 |
| Cleanability | 3 | 1 | 1 | 3 | 2 | 1 | 3 | 3 | 3 |
| Contact angle | 31 | 22 | 22 | 31 | 22 | 22 | 31 | 19 | 23 |
| Contact angle with respect to base material with dry film | 30 | 21 | 21 | 30 | 21 | 21 | 30 | 18 | 20 |
| Coloring property | A | B | A | A | B | B | A | B | A |
| Abrasion resistance | C | A | B | C | A | A | B | A | B |
| Clogging property | A | B | A | C | B | A | B | A | A |
| Continuous printing | A | B | B | B | B | A | B | A | A |
| Filling | A | B | A | B | B | A | B | A | B |

Recording Test

An ink composition and a reaction solution were filled in a modified machine of an ink jet printer (trade name PX-G 930, manufactured by Seiko Epson Corporation). Specifically, the reaction solutions and the inks used in the tests were filled one by one in the nozzle rows. The modified machine is provided with a platen heater. The recording medium discharged from the printer described above was secondarily dried in an oven. As a recording medium, a PET film "Lumirror S10" manufactured by Toray Industries, Inc. was used.

In Table 3, in the example using the reaction solution, the reaction solution was initially attached as a pattern at an attachment amount of 2 mg/inch$^2$, the recording medium was reversely fed and reset, and ink was superimposed on the pattern.

In the ink attachment, the pattern was recorded by attaching with an attachment amount of 9 mg/inch$^2$ with a resolution of 720 dpi horizontally and 720 dpi vertically. The attachment of the reaction solution and ink was carried out by setting the surface temperature of the recording medium to the primary drying temperature in the table.

After the attachment was completed, the recording medium was discharged from the printer in an oven at the temperatures in the table and secondary drying was carried out at 80° C. for 2 minutes.

Member SP

The SP value of the member forming the head inner wall is a value obtained by calculation as described above. Three types of members shown below were used as members in contact with ink in the head.

SP value 7.8: The flow path of the head was formed of silicon.

SP value 8.5: An inorganic metal compound was formed in a film on the surface in contact with the ink of the head flow path (formed of silicone).

SP value 9.5: A coating solution having an acrylic-based resin dissolved therein was coated on the surface in contact with the ink of the head flow path (formed of silicon) and dried to form a resin film. Here, a tendency was seen for the resin film to deteriorate after the ink was filled and left to stand at 50° C. for 1 month.

Head Configuration

In Table 3, the head 1 is the type of head shown in FIG. 1 in which the piezoelectric element 23 is not in a position facing the ink outlet 24 of the pressure chamber 21. The head 2 is a head where the piezoelectric element is at a position opposing the ink outlet of the pressure chamber, and in FIG. 1, the piezoelectric element 23 is arranged directly above the nozzle 22.

Cleanability

A member forming the head inner wall was cut out into a flat plate shape to obtain a flat plate sample. This sample was coated with ink, left for 1 month at room temperature and dried. Thereafter, the member was immersed in the ink in the container, and the container was sealed and left at room temperature for 1 hour. Thereafter, the member was removed from the container, the member was immersed in water for 1 minute, taken out, and the ink adhesion portion of the member was visually observed. The evaluation criteria are shown below.

1 It is not possible to see ink residue.
2 It is possible to see some ink residue.
3 It is possible to see a lot of ink residue.

Contact Angle: Static Contact Angle

A member forming the head inner wall was cut out into a flat plate shape to obtain a flat plate sample. Then, the static contact angle was measured according to the static drop method of JIS R 3257 (a wettability test method for a substrate glass surface), except that the substrate glass was changed to the flat plate sample and pure water was changed to ink. For the measurement apparatus, measurement was carried out by the sessile drop method (static drop method) using an automatic contact angle measuring apparatus OCAH 200 (trade name, manufactured by Data Physics). The static contact angle is a value (average value of 5 points) obtained by dropping 1 μL of ink droplets onto the above sample and measuring the contact angle 1 minute after dropwise addition.

Contact Angle with Respect to Base Material with Dry Film

In the above contact angle test, instead of the member sample, the inks of each example were coated on the member by a bar coater at a coating amount of 3 μm in thickness of the ink, dried for 2 hours at 100° C. in a thermostat, a base material on which an ink dried film was formed was created, and the contact angle of the ink was measured in the same manner using this base material as a base material. The solid content of the ink partially attaches to the base material and is not a complete film. Part of the base material is also exposed.

Coloring Property

After recording by the recording test, the OD value of ink in a solid pattern of recorded matter was measured using Spectrolino (trade name: manufactured by GretagMacbeth). The evaluation criteria are shown below.

A OD 1.5 or more
B OD 1.2 or more
C OD less than 1.2

Abrasion Resistance

After recording according to the above recording test, the recorded surface of the recorded matter was rubbed 20 times with a cotton cloth under a load of 200 g using a color fastness rubbing tester AB-301 (trade name, manufactured by Tester Sangyo Co., Ltd.), at which time the abrasion resistance was evaluated by checking the peeled state of the recording surface and the ink transferred state to the cotton cloth. The evaluation criteria are shown below.

A No scratches or peeling.
B There are scratches or peeling of 1% or less of the stroke area.
C There are scratches or peeling exceeding 1% of the stroke area.

Clogging Property

An ink composition was filled in the nozzle rows of the recording apparatus used for the recording test, and the ink composition was left for 1 month in a cap open state. After being left to stand, suction cleaning of the nozzle was performed. 3 mL of ink was suctioned and discharged from the nozzle row. The evaluation criteria are shown below.

A All the nozzles were recovered by one suction cleaning.
B All nozzles were recovered with 2 to 3 suction cleanings.
C There was a nozzle which did not recover even with three suction cleanings.

Continuous Printing

Continuous printing was performed under the recording conditions of the recording test. In continuous printing, nozzles which are not used for recording (no ink is ejected) in the nozzle rows were provided in half of all the nozzle rows. One nozzle row was set to 180 nozzles. The nozzle was flushed with a flushing box every pass. Suction cleaning was not performed during recording. Recording was carried out for 2 hours continuously. After completion, suction cleaning of the nozzle was performed. 3 mL of ink was suctioned and discharged from the nozzle row. The evaluation criteria are shown below.

A All the nozzles were recovered by one suction cleaning.
B All nozzles were recovered with 2 to 3 suction cleanings.
C There was a nozzle which did not recover even with three suction cleanings.

Filling

A dot row of 720 dpi was recorded with an appropriate amount of 90 ng of ink per dot. The outline of the dot row was observed by visual observation and using a loupe. The evaluation criteria are shown below.

A The line is straight in visual observation and loupe observation and the line is not interrupted.
B Although the line appears straight with visual observation, when observed with a loupe, a thinned portion is visible.
C There are portions where the lines are broken in visual observation or loupe observation.

As shown in Table 1, the ink composition of the Examples was highly evaluated in terms of the coloring property, abrasion resistance, clogging property, continuous printing, and filling.

For example, in Comparative Example 1 using the ink 6 having an SP value exceeding 30 with respect to the member in the head, the filling and coloring with respect to the recording medium were sufficient; however, in the results, the evaluation of clogging property and continuous printing was inferior since the contact angle was low.

In addition, although Comparative Examples 2 and 3 had clogging resistance due to including glycerin which is a high-boiling solvent, in the results, the abrasion resistance was inferior.

In Comparative Example 4, since the primary drying temperature was low, evaluation of continuous printing was the result.

In Example 11, since the primary drying was a high temperature, in the results, the evaluation of the continuous printing and the like was deteriorated as compared with Example 1 using the same ink 1.

As shown in Reference Examples 2 and 3, in a case where the head flow path was formed of a resin film, there was no problem in the evaluation results of the clogging property and the like shown in Table 3; however, Reference Examples 2 and 3 were not suitable for manufacturing a head, and, in the results, the ink resistance of the member was deteriorated.

The entire disclosure of Japanese Patent Application No. 2016-128051, filed Jun. 28, 2016 is expressly incorporated by reference herein.

What is claimed is:

1. An ink jet recording method comprising:
ejecting a water-based ink composition where a content of an organic solvent having a standard boiling point of 280° C. or more is 3% by mass or less with respect to a total mass of the ink composition from a head having a nozzle and attaching the water-based ink composition to a recording medium; and
heating the recording medium during the attaching of the water-based ink composition to the recording medium,
wherein a surface temperature of the recording medium when the water-based ink composition is attached to the recording medium is 38° C. or less;
wherein a contact angle between at least a part of a surface of a member in contact with the water-based ink composition in members in the head and the water-based ink composition is 30° or less, and the surface of the member in contact with the water-based ink composition is formed of a material having an SP value of 9 or less that is selected from the group consisting of silicon nitride, aluminum oxide, titanium oxide, and tantalum oxide; and
wherein the water-based ink composition includes:
resin fine particles in an amount of 3% by mass or more with respect to the total mass of the ink composition, and
a surfactant which is a silicone-based surfactant or a fluorine-based surfactant, and the content of the surfactant is 1% by mass or more with respect to the total mass of the ink composition.

2. The ink jet recording method according to claim 1, wherein a surface temperature of the recording medium when the water-based ink composition is attached to the recording medium is 35° C. or less.

3. The ink jet recording method according to claim 1, wherein a surface tension of the water-based ink composition is 27 mN/m or less.

4. The ink jet recording method according to claim 1, wherein the water-based ink composition includes an organic solvent having a standard boiling point of 260° C. or less.

5. The ink jet recording method according to claim 1, wherein the head is provided with a pressure chamber, and an element for applying pressure to the pressure chamber to eject the water-based ink composition from the nozzle, in which, in the pressure chamber, the element is arranged at a location other than a position opposed to an outlet which communicates with the nozzle.

6. The ink jet recording method according to claim 1, wherein the surfactant has an HLB value of 8 to 16.

7. The ink jet recording method according to claim 6, wherein the content of the surfactant is 0.5% by mass or more.

8. The ink jet recording method according to claim 1, wherein the recording medium is a non-absorbing or low absorbing recording medium.

9. The ink jet recording method according to claim 1, wherein the water-based ink composition includes resin fine particles as 3 to 10% by mass.

10. The ink jet recording method according to claim 1, wherein the water-based ink composition has a contact angle of 25° or less with respect to a base material formed by forming a coating film of the water-based ink composition on the member.

11. A control method of an ink jet recording apparatus including a control portion and a head, the method comprising:
causing the control portion to control the ink jet recording apparatus so as to perform recording by the ink jet recording method according to claim 1.

12. The control method of the ink jet recording apparatus according to claim 11, the method further comprising:
causing the control portion to control the ink jet recording apparatus so as to perform recording for one hour or more without performing a maintenance step of discharging the water-based ink composition from a nozzle using a mechanism other than a mechanism for ejecting ink for recording provided in the head.

13. The ink jet recording method according to claim 1, wherein the content of an organic solvent having a standard boiling point of 280° C. or more is 2% by mass or less.

14. The ink jet recording method according to claim 1, wherein a surface temperature of the recording medium in the attaching of the water-based ink composition to the recording medium is 30° C. to 38° C.

15. The ink jet recording method according to claim 1, wherein a content of the surfactant is 1 to 3% by mass or more with respect to the total mass of the ink composition.

16. The ink jet recording method according to claim 1, wherein the amount of resin fine particles is 5% by mass or more with respect to the total mass of the ink composition.

17. The ink jet recording method according to claim 1, wherein a surface temperature of the recording medium when the water-based ink composition is attached to the recording medium is 20° C. to 38° C.

18. The ink jet recording method according to claim 1, wherein the surface of the member in contact with the water-based ink composition is formed of an inorganic metal compound.

19. The ink jet recording method according to claim 1, further comprising attaching a reaction solution including an aggregating agent for aggregating the components of the ink composition to the recording medium.

* * * * *